(12) United States Patent
Ko et al.

(10) Patent No.: US 11,316,677 B2
(45) Date of Patent: Apr. 26, 2022

(54) QUANTUM KEY DISTRIBUTION NODE APPARATUS AND METHOD FOR QUANTUM KEY DISTRIBUTION THEREOF

(71) Applicant: ELECTRONICS AND TELECOMMUNICATIONS RESEARCH INSTITUTE, Daejeon (KR)

(72) Inventors: Haeng-Seok Ko, Daejeon (KR); Se Wan Ji, Daejeon (KR); Younchang Jeong, Daejeon (KR); Osung Kwon, Daejeon (KR); Seok Kim, Daejeon (KR); Eun Ji Kim, Daejeon (KR); Changho Hong, Daejeon (KR); Jingak Jang, Daejeon (KR); Daesung Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 43 days.

(21) Appl. No.: 17/069,073

(22) Filed: Oct. 13, 2020

(65) Prior Publication Data
US 2022/0006627 A1 Jan. 6, 2022

(30) Foreign Application Priority Data
Jul. 3, 2020 (KR) .................. 10-2020-0082051

(51) Int. Cl.
*H04L 9/06* (2006.01)
*H04L 9/08* (2006.01)
(Continued)

(52) U.S. Cl.
CPC .......... *H04L 9/0855* (2013.01); *H04L 9/0618* (2013.01); *H04L 9/0827* (2013.01);
(Continued)

(58) Field of Classification Search
CPC ... H04L 9/0855; H04L 9/0618; H04L 9/0827; H04L 9/0833; H04L 9/0869; H04L 9/12; H04L 9/14
See application file for complete search history.

(56) References Cited

U.S. PATENT DOCUMENTS 10,382,198 B2    8/2019   Choi
2016/0315768 A1* 10/2016  Fu ..................... H04L 63/0853
(Continued)

FOREIGN PATENT DOCUMENTS

KR   10-1776137 B1   9/2017

*Primary Examiner* — Vu V Tran
(74) *Attorney, Agent, or Firm* — LRK Patent Law Firm

(57) ABSTRACT

A quantum key distribution (QKD) node apparatus and a QKD method therein. The QKD node apparatus may include a QKD module for generating quantum keys and quantum key IDs, a quantum key synchronization management module for storing the quantum keys and the quantum key IDs as outbound and inbound quantum keys in a distributed manner and sharing the outbound and inbound quantum keys with a second QKD node apparatus, and a quantum key orchestration module for delivering a master key and a master key ID to a secure application connected therewith in response to a request for the master key with the ID of a second secure application and delivering a packet including the master key encrypted with the outbound quantum key shared with the second QKD node apparatus, the master key ID, and a quantum key ID, to the second QKD node apparatus.

13 Claims, 11 Drawing Sheets

(51) Int. Cl.
*H04L 9/14* (2006.01)
*H04L 9/12* (2006.01)

(52) U.S. Cl.
CPC .......... *H04L 9/0833* (2013.01); *H04L 9/0869* (2013.01); *H04L 9/12* (2013.01); *H04L 9/14* (2013.01)

(56) References Cited

U.S. PATENT DOCUMENTS

| | | |
|---|---|---|
| 2017/0237559 A1 | 8/2017 | Yuan et al. |
| 2018/0062836 A1* | 3/2018 | Tanizawa ................ H04L 9/14 |
| 2019/0149327 A1* | 5/2019 | Yuan ........................ H04L 9/14 380/255 |
| 2020/0351086 A1* | 11/2020 | Walenta ................ H04L 9/0894 |
| 2021/0083864 A1* | 3/2021 | Bush ..................... H04L 9/0819 |

* cited by examiner

QUANTUM KEY DISTRIBUTION NODE APPARATUS AND METHOD FOR QUANTUM KEY DISTRIBUTION THEREOF

CROSS REFERENCE TO RELATED APPLICATION

This application claims the benefit of Korean Patent Application No. 10-2020-0082051, filed Jul. 3, 2020, which is hereby incorporated by reference in its entirety into this application.

BACKGROUND OF THE INVENTION

1. Technical Field

The disclosed embodiment relates to Quantum Key Distribution (QKD) technology.

2. Description of Related Art

Key distribution for sharing the same encryption key between two secure applications has traditionally been regarded as a difficult problem. As measures for the security of key distribution, a method using a Pre-Shared Key (PSK) and a public-key cryptography method, which is asymmetric cryptography using different keys for encryption and decryption, are mainly used.

In the pre-shared key method, a shared key is required to be delivered to a secure application by a trusted sender and to be stored and managed by a trusted manager. That is, because security must be ensured throughout the life cycle of the shared key, including generation, delivery, storage, and the like of thereof, it is difficult to manage the shared key.

In the public-key cryptography method, public-key cryptography, based on a pair comprising a private key and a public key, is designed based on the computational difficulty of factorization of the product of two large numbers and a discrete logarithm problem. However, because cryptography keys are expected to be easily deciphered by factorizing a large number and solving a discrete logarithm problem with the advent of quantum computers, public-key cryptography is known to be vulnerable to security issues.

In order to securely distribute cryptography keys against the threats of quantum computers, a lot of research on Post-Quantum Cryptography (PQC) and Quantum Key Distribution (QKD) has been performed.

PQC is secure public-key cryptography using a hard mathematical problem that makes it impossible to discover a cryptography key even though it is calculated using a quantum computer. QKD uses the no-cloning theorem of quantum physics and the phenomenon whereby a quantum state is destroyed after it is measured.

In the case of QKD, when a photon in a quantum state transmitted by a sender is first measured by an eavesdropper, a Quantum Bit Error Rate (QBER) increases, whereby the presence of the eavesdropper is detected. Accordingly, two quantum key distribution modules may securely share a quantum key, and a QKD protocol may ensure unconditional information-theoretic security.

However, a QKD network system has the following problems.

First, whether a secure application entity that is connected with a QKD node as a part of a conventional QKD network system takes a master role or a slave role should be determined in advance before the arrangement thereof, and a key request must first be made by the master. Accordingly, the conventional QKD network system has a problem in which it is necessary to assign a master role or a slave role to a secure application entity and to manage a list of target secure application entities with which the secure application entity can communicate.

Also, when multiple secure application entities are connected with the same QKD node in a conventional QKD network system, the QKD node must sequentially process key requests from the multiple secure application entities. Therefore, when the current key request is processed, the QKD node blocks additional key requests from secure application entities, other than the secure application entity that made the current key request, which may degrade service efficiency related to key requests.

SUMMARY OF THE INVENTION

An object of an embodiment is to solve a problem in which whether a secure application entity takes a sender role or a receiver role needs to be determined in advance in a quantum key distribution network system.

Another object of an embodiment is to solve a problem of degradation of performance in processing key requests from multiple secure application entities in a quantum key distribution network system.

A quantum key distribution (QKD) node apparatus according to an embodiment may include a QKD module for generating quantum keys and quantum key IDs; a quantum key synchronization management module for storing the quantum keys and the quantum key IDs generated by the QKD module as an outbound quantum key and an inbound quantum key in a distributed manner and for sharing the outbound quantum key and the inbound quantum key with a second QKD node apparatus; and a quantum key orchestration module for delivering a master key, generated using a random number, and a master key ID to a secure application connected therewith when the master key is requested by the secure application using the ID of a second secure application, and for transmitting a packet including the master key encrypted with the outbound quantum key shared with the second QKD node apparatus connected with the second secure application, the master key ID, and the quantum key ID to the second QKD node apparatus.

Here, the QKD modules equal in number to the number of quantum key synchronization management modules may be connected therewith in a one-to-one manner, and each of the QKD module and the quantum key synchronization management module may be one or more in number.

Here, the quantum key orchestration module may retrieve a path corresponding to the ID of the second secure application based on an internal routing table, and may transmit a packet, including the master key encrypted with an outbound quantum key shared with a relay QKD node apparatus, the master key ID, information about the path, and a quantum key ID, to the relay QKD node apparatus when the relay QKD node apparatus for relaying is present on the path.

Here, when the second secure application is connected with the QKD node apparatus, the quantum key orchestration module may deliver the master key corresponding to the master key ID when a key request is made by the second secure application using the master key ID.

Here, when a group key is requested by the secure application connected with the QKD node apparatus using the IDs of multiple secure applications as parameters, the quantum key orchestration module may deliver the group key, generated using a random number, and a group key ID to the secure application, retrieve a path along which the group key is transmitted using an internal routing table and the IDs of the multiple secure applications, and transmit a packet including the group key encrypted with an outbound quantum key shared with a next QKD node apparatus on the path, the group key ID, information about the path, the IDs of the multiple secure applications, and a quantum key ID to the next QKD node apparatus on the path.

Here, when a large number of master keys is requested by the secure application connected with the QKD node apparatus, the quantum key orchestration module may encrypt the large number of master keys with the outbound quantum key based on a block cipher.

A quantum key distribution (QKD) node apparatus according to an embodiment may include a QKD module for generating quantum keys and quantum key IDs; a quantum key synchronization management module for storing the quantum keys and the quantum key IDs generated by the QKD module as an outbound quantum key and an inbound quantum key in a distributed manner and sharing the outbound quantum key and the inbound quantum key with a second QKD node apparatus; and a quantum key orchestration module for decrypting a master key included in a packet with the inbound quantum key shared with the second QKD node apparatus upon receiving the packet, including the encrypted master key, a master key ID, and the quantum key ID, from the second QKD node apparatus, and for delivering the master key corresponding to the master key ID to a secure application connected with the QKD node apparatus upon receiving the master key ID from the secure application.

Here, the QKD modules equal in number to the number of quantum key synchronization management modules may be connected therewith in a one-to-one manner, and each of the QKD module and the quantum key synchronization management module may be one or more in number.

Here, the quantum key orchestration module may decrypt the encrypted master key with the inbound quantum key pertaining to the second QKD node apparatus when it is confirmed that the QKD node apparatus is required to relay the master key based on information about a path included in a packet upon receiving the packet from the second QKD node apparatus, encrypt the decrypted master key with an outbound quantum key shared with a third QKD node apparatus, which is a next QKD apparatus on the path, generate a packet including the encrypted master key, the information about the path, the master key ID, and a quantum key ID, and transmit the packet to the third QKD node apparatus.

Here, when the packet includes a group key and the IDs of multiple secure applications and when the ID of the secure application connected with the QKD node apparatus is included in the IDs of the multiple secure applications, the quantum key orchestration module may store the group key and a group key ID and delete path information pertaining to the QKD node apparatus and the ID of the secure application connected with the QKD node apparatus from the packet.

Here, when the master key is present in a large number thereof, the quantum key orchestration module may decrypt the master key based on a block cipher.

A quantum key distribution method according to an embodiment may include delivering, by a quantum key distribution (QKD) node apparatus, a master key generated using a random number and a master key ID to a secure application connected with the QKD node apparatus in response to a request from the secure application for the master key, which is required for quantum cryptographic communication with a second secure application; and when the second secure application is a secure application connected with the QKD node apparatus, delivering, by the QKD node apparatus, the master key corresponding to the master key ID when the master key is requested by the second secure application with the master key ID.

The quantum key distribution method may further include, when the second secure application is not a secure application connected with the QKD node apparatus, encrypting, by the QKD node apparatus, the master key with an outbound quantum key shared with a second QKD node apparatus connected with the second secure application; and delivering, by the QKD node apparatus, a packet including the encrypted master key, the master key ID, and a quantum key ID, to the second QKD node apparatus.

The quantum key distribution method may further include, when receiving the packet including the encrypted master key, the master key ID, and the quantum key ID from the QKD node apparatus, decrypting, by the second QKD node apparatus, the master key included in the packet with an inbound quantum key shared with the QKD node apparatus; storing, by the second QKD node apparatus, the master key; and delivering, by the second QKD node apparatus, the master key corresponding to the master key ID to the second secure application connected with the second QKD node apparatus when the master key is requested by the second secure application using the master key ID.

Here, delivering the packet to the second QKD node apparatus may include, when the second secure application is not a secure application connected with the QKD node apparatus, retrieving a routing path using an internal routing table and the ID of the second secure application; and when a relay QKD node apparatus is present on the routing path, encrypting the master key with an outbound quantum key shared with the relay QKD node apparatus and transmitting a packet including the master key, the master key ID, information about the routing path, and a quantum key ID to the relay QKD node apparatus.

The quantum key distribution method may further include, when the relay QKD node apparatus receives the packet from the QKD node apparatus and confirms that the relay QKD node apparatus is required to relay the master key based on the information about the routing path included in the packet, decrypting, by the relay QKD node apparatus, the encrypted master key with an inbound quantum key pertaining to the QKD node apparatus; encrypting, by the relay QKD node apparatus, the decrypted master key with an outbound quantum key shared with a third QKD node apparatus, which is a next QKD apparatus on the routing path; generating a packet including the encrypted master key, the information about the routing path, the master key ID, and a quantum key ID; and transmitting the packet to the third QKD node apparatus.

The quantum key distribution method may further include, when the third QKD node apparatus receives the packet from the relay QKD node apparatus and confirms that the third QKD node apparatus is a final destination based on the information about the routing path included in the packet, decrypting, by the third QKD node apparatus, the encrypted master key with an inbound quantum key pertaining to the relay QKD node apparatus; and delivering, by the third QKD node apparatus, the master key corresponding to the master key ID to a secure application connected with the third QKD node when the master key is requested by the secure application using the master key ID.

The quantum key distribution method may further include, when a group key is requested by the secure application connected with the QKD node apparatus using the IDs of multiple secure applications as parameters, generating, by the QKD node apparatus, the group key using a random number and delivering the generated group key and a group key ID to the secure application; retrieving, by the QKD node apparatus, a path, along which the group key is to be transmitted, using an internal routing table and the IDs of the multiple secure applications; and delivering, by the QKD node apparatus, a packet including the group key encrypted with an outbound quantum key shared with a next QKD node apparatus on the path, the group key ID, information about the path, the IDs of the multiple secure applications, and a quantum key ID to the next QKD node apparatus on the path.

The quantum key distribution method may further include, when the packet includes the group key and when the IDs of the multiple secure applications include an ID of a secure application connected with the next QKD node apparatus on the path, storing, by the next QKD node apparatus on the path, the group key and the group key ID; and deleting, by the next QKD node apparatus on the path, path information pertaining thereto and the ID of the secure application connected with the next QKD node apparatus on the path from the packet.

Here, when the master key is present in a large number thereof, the master key may be encrypted or decrypted based on a block cipher.

BRIEF DESCRIPTION OF THE DRAWINGS

The above and other objects, features and advantages of the present invention will be more clearly understood from the following detailed description, taken in conjunction with the accompanying drawings, in which.

DESCRIPTION OF THE PREFERRED EMBODIMENTS

Figure 1:
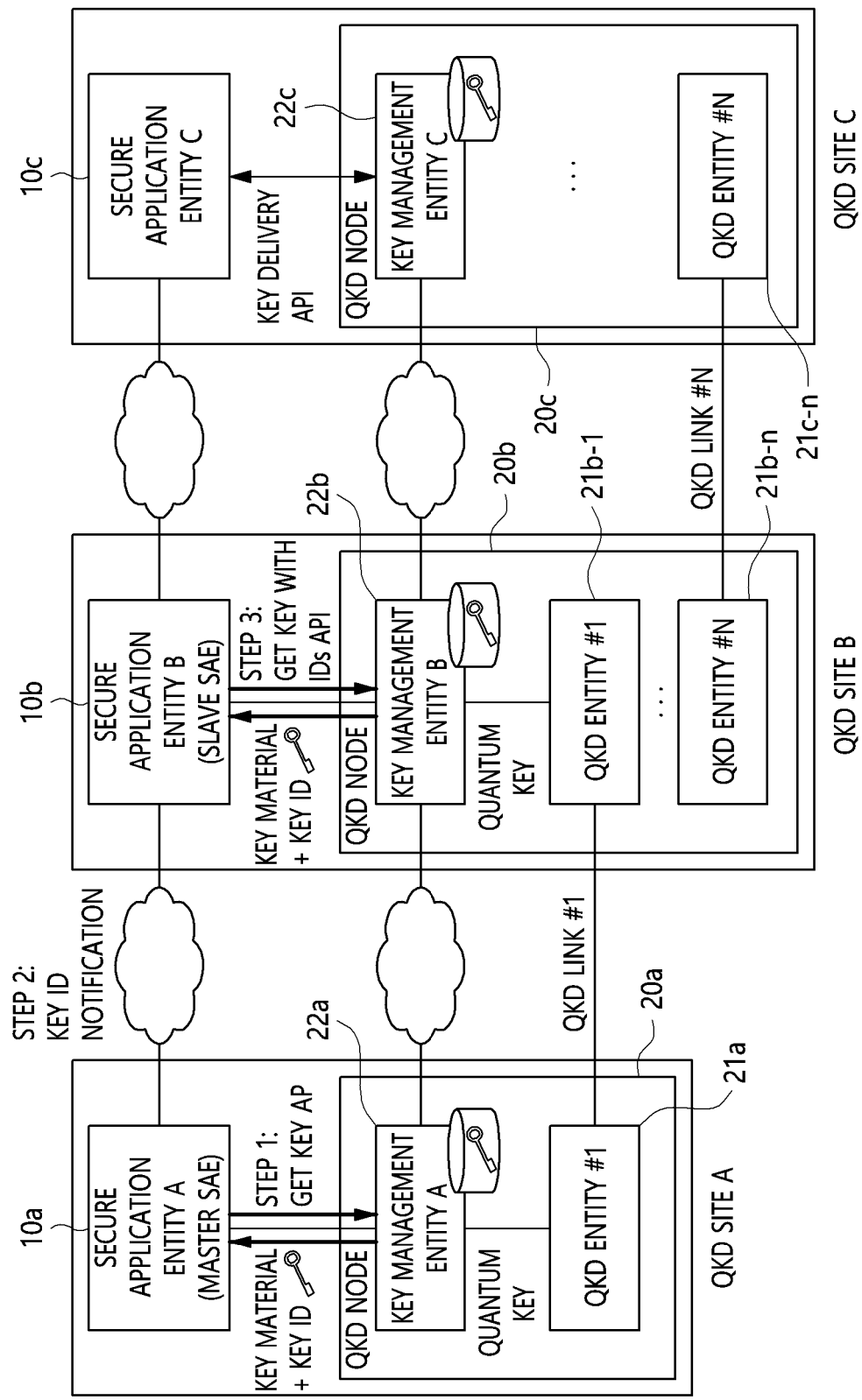
FIG. 1 is a schematic block diagram of a general quantum key distribution network system.

The advantages and features of the present invention and methods of achieving them will be apparent from the following exemplary embodiments to be described in more detail with reference to the accompanying drawings. However, it should be noted that the present invention is not limited to the following exemplary embodiments, and may be implemented in various forms. Accordingly, the exemplary embodiments are provided only to disclose the present invention and to let those skilled in the art know the category of the present invention, and the present invention is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present invention.

The terms used herein are for the purpose of describing particular embodiments only and are not intended to limit the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, an apparatus and method for quantum key distribution in a quantum key distribution network system according to an embodiment will be described in detail with reference to FIGS. 1 to 11.

FIG. 1 is a schematic block diagram of a general quantum key distribution network system.

Referring to FIG. 1, a quantum key distribution network system includes Secure Application Entities (SAEs) 10a, 10b and 10c and Quantum Key Distribution (QKD) nodes 20a, 20b and 20c, and quantum cryptography is performed therein.

The QKD nodes 20a, 20b and 20c and the SAEs 10a, 10b and 10c are located in securely managed quantum key distribution sites, for example, a QKD site A, a QKD site B and a QKD site C, and the QKD sites are connected with each other, whereby a quantum key distribution network over which a quantum key is transmitted is formed.

The QKD nodes 20a, 20b and 20c may include respective QKD entities (QKDE) 21a, 21b and 21c and respective key management entities (KME) 22a, 22b and 22c.

The QKD entities 21a, 21b and 21c generate quantum keys. Here, one QKD entity 21a, 21b or 21c or two or more QKD entities may be included in each of the QKD nodes 20a, 20b and 20c. For example, referring to FIG. 1, the QKD node 20b may include two or more QKD entities 21b-1, 21b-n.

Here, the two or more QKD entities 21b-1, . . . , 21b-n may use the same QKD method, or may use different QKD methods.

Here, the QKD entities 21a, 21b and 21c included in different sites may be connected through QKD links.

Here, the QKD link may include a quantum channel for delivering a photon and a public channel for delivering information for extracting a key.

Here, the quantum channel generally uses a dedicated optic fiber channel. The QKD entity includes a transmission device for transmitting a photon in which a quantum state is encoded and a reception device for receiving a photon and measuring a quantum state, and a pair comprising a transmission device and a reception device is connected in a P2P manner.

The KMEs 22a, 22b and 22c store quantum keys and deliver the quantum keys to the respective SAEs 10a, 10b and 10c in response to a request therefrom. Here, regardless of the number of QKD entities 21a, 21b or 21c included in each of the QKD nodes 20a, 20b and 20c, a single KME 22a, 22b or 22c may be present in each of the QKD nodes 20a, 20b and 20c.

One or more SAEs 10a, 10b or 10c may be connected with each of the QKD nodes 20a, 20b and 20c. Here, the role of each of the SAEs 10a, 10b and 10c is classified as a master (sender) SAE or a slave (receiver) SAE. Whether each of SAEs takes a master role or a slave role is determined when the SAEs are initially arranged, and the role is fixed.

The master SAE first makes a key request, and the slave SAE requests a key using the key ID received from the master SAE, whereby the two SAEs perform cryptographic communication using the same cryptography key supplied from the respective QKD nodes.

The above-described quantum key distribution network system may operate as follows.

The transmission device of the quantum key distribution network system transmits a photon in a quantum state, in which a randomly selected basis and a random number are encoded, through a quantum channel, and the reception device of the quantum key distribution network system randomly selects a basis and measures the quantum state of the photon. Here, the transmission device transmits the photon randomly mixed with a decoy signal to the reception device in preparation for quantum hacking, such as a photon-number-splitting attack or the like.

The quantum state generated by the transmission device and the quantum state measured by the reception device are stored as a raw key, and the decoy information transmitted by the transmission device, information about the basis selected by each of the transmission device and the reception device, and the like are exchanged with each other through a public channel, whereby a shifted key is generated.

When a Quantum Bit Error Rate (QBER) is measured in this process, whether information is eavesdropped upon may be determined. Then, a secret key is generated from the shifted key using an error correction method, a privacy amplification method, and the like, whereby the two QKD entities connected in a one-to-one manner have the same quantum key.

The same quantum key generated in the two QKD entities is delivered to the respective KMEs.

The KME functions to receive the quantum key from the QKD entity, to store the same in a quantum key buffer, to relay a key, to connect with an SAE, and the like. Because a quantum key generation rate in the QKD entity is slow and is not constant, the KME stores the quantum key in the buffer and delivers the quantum key stored in the buffer in response to a request from the SAE. Here, when two sites are not connected in a P2P manner and when it is necessary to pass through one or more sites in order to share a key with the remote site, the KME also serves to relay the key.

Here, various methods may be used in order for the KME to relay a key, and a method in which a quantum key between P2P sites is delivered by performing an exclusive-OR operation, a method in which a random number generated as a quantum key between P2P sites is delivered by performing an exclusive-OR operation, a method in which a public key is delivered as a quantum key between P2P sites by performing an exclusive-OR operation, and the like may be included.

When a master SAE requests a key (Get Key) from the KME to which the master SAE pertains, the KME sends a quantum key and a key ID corresponding to the quantum key to the master SAE (STEP 1). Then, the master SAE transmits the key ID to a slave SAE (STEP 2) and prepares for cryptographic communication using the quantum key received from the KME.

The slave SAE receives the key ID from the master SAE and requests a key from the KME, to which the slave SAE pertains, with the key ID (Get Key with Key ID). The KME receiving the key request with the key ID retrieves a quantum key corresponding to the key ID and sends the quantum key to the slave SAE (STEP 3).

Through this key-sharing transaction, the master SAE and the slave SAE share the same quantum key and the same key ID and perform cryptographic communication using the shared quantum key as a master key.

Generally, Transport Layer Security (TLS) is used in the communication channel between the SAE and the KME, whereby the communication channel is protected. Also, the SAE and the KME are mounted in a single server rack in the same site, and are securely managed through physical security.

However, the general quantum key distribution system described above has the following problems.

First, when the role of the SAE is fixed as a master role or a slave role as describe above, constraints may occur in the operation thereof.

The slave SAE is not able to first make a key request, and the master SAE is not able to acquire a quantum key using a key ID. If cryptographic communication is performed without determining the roles of the SAEs in the quantum key distribution system, when an SAE starts a key request process before a key-sharing transaction requested by another SAE is completed, synchronization of a quantum key is broken depending on the sequence of the requested quantum keys, and a race condition or a deadlock may be caused. In order to prevent this, the SAE connected with the QKD node is operated by fixing the role so as to take a master role or a slave role.

However, assuming that SAEs are used for secure video calls, the conventional method imposes selection of the SAE to make a video call. That is, because it is necessary to previously identify the SAE to make a video call and the SAE to receive the video call, the efficiency of the SAEs is degraded, and the operation thereof is awkward.

Also, when multiple SAEs are used by being connected with a single QKD node in the conventional quantum key distribution network system, performance in processing quantum key requests may be degraded.

Conventional QKD nodes were designed such that the QKD nodes are used for SAEs for a link in order to protect a high-speed link. Generally, when a single SAE for a link is used by being connected with a single QKD node and when whether the SAE takes a master role or a slave role is determined in advance, there is no problem in operation. However, because a QKD node is an expensive device, it is desirable to connect multiple SAEs therewith. However, when multiple SAEs are used by being connected with a conventional QKD node, processing performance is degraded.

It may be assumed that QKD nodes are respectively installed in a site A and a site B and that multiple video phones are installed and operated in each of the sites.

When an SAE in the site A requests a quantum key from the QKD node and intends to perform cryptographic communication with an SAE in the site B by transmitting a key ID thereto, if an additional SAE in the site A requests a quantum key before the key-sharing transaction is finished, the sequence of the quantum keys managed in the QKD node may be broken. Specifically, when the key-sharing transaction is terminated abnormally due to an error or a timeout, the key ID in the site A becomes different from the key ID in the site B, whereby key synchronization may be broken. This is because the site A already provides a quantum key to the additional SAE that made the key request before the key-sharing transaction is finished. In order to prevent this situation, when an SAE requests a key, the QKD node blocks other key requests until the current key-sharing transaction is finished, thereby preventing an additional SAE from making a key request. Due to this blocking, the additional SAE is not able to use the QKD node until the transaction is completed, which may degrade the performance and efficiency of the QKD node.

In order to enable the conventional quantum key distribution network system to be more widely used, any SAE connected with a QKD node should be allowed to first start a key-sharing transaction without determining in advance whether the SAE takes a master role or a slave role.

Also, in order to enable a QKD node to process a key request without a delay in an environment in which multiple SAEs are connected with the QKD node, the structure of the QKD node and a protocol therefor should be configured not to block a key request even when a key-sharing transaction is being processed.

Accordingly, the present invention proposes a quantum key distribution node apparatus and a quantum key distribution method therein in order to solve the above-described problems.

As described above, the conventional quantum key distribution network system applies a method in which a quantum key is delivered from a QKD entity to an SAE via a KME. This method makes it difficult to maintain key synchronization because the QKD entity, the KME, and the SAE use the same quantum key together in the process of generating and using the quantum key. The structure of a QKD node apparatus and a quantum key distribution method therein according to an embodiment are configured to separate an outbound quantum key from an inbound quantum key and to use the quantum keys only in a quantum key orchestration module, whereby synchronization of the quantum key may be easily maintained.

Figure 2:
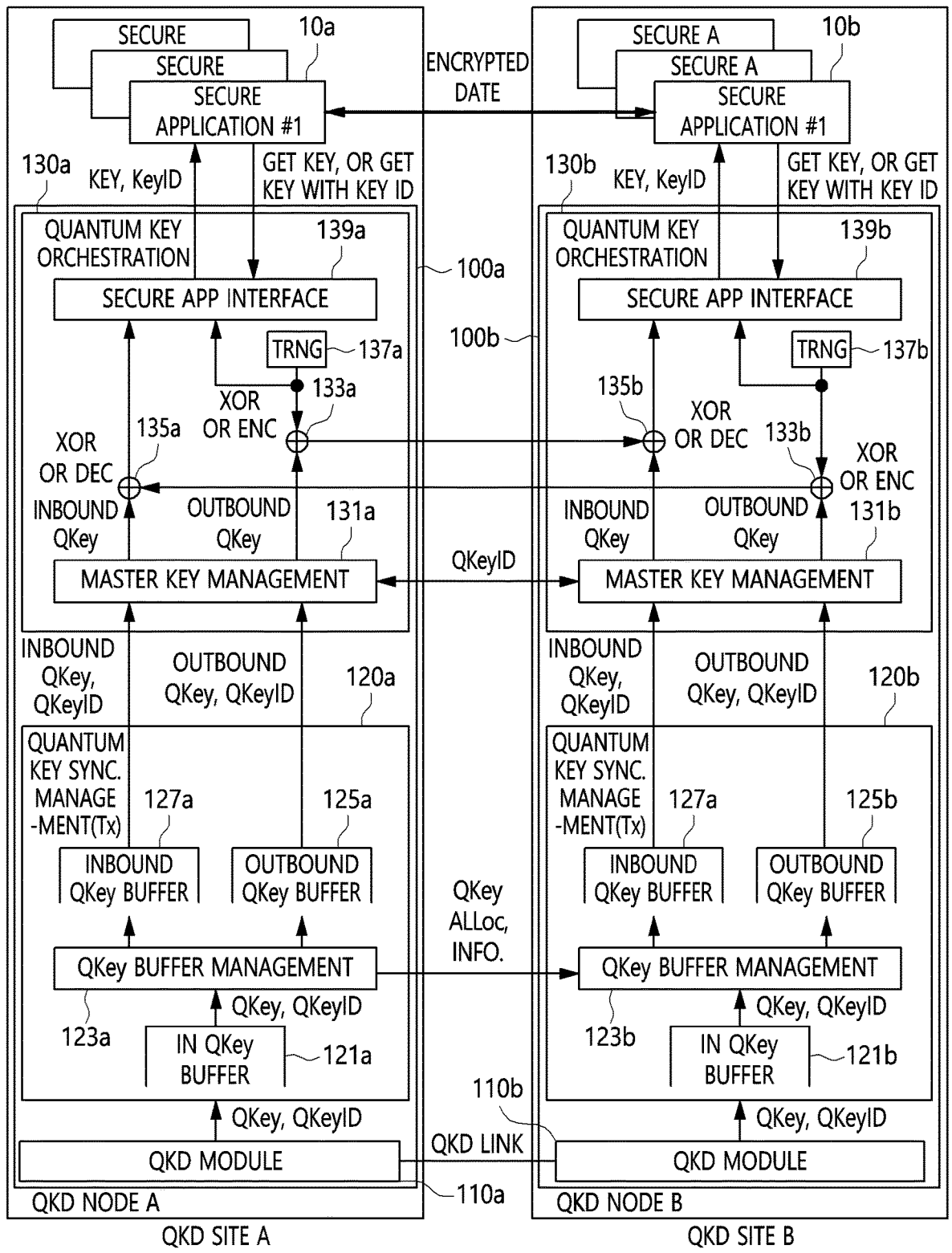
FIG. 2 is a schematic block diagram of a quantum key distribution network system according to an embodiment.
Figure 3:
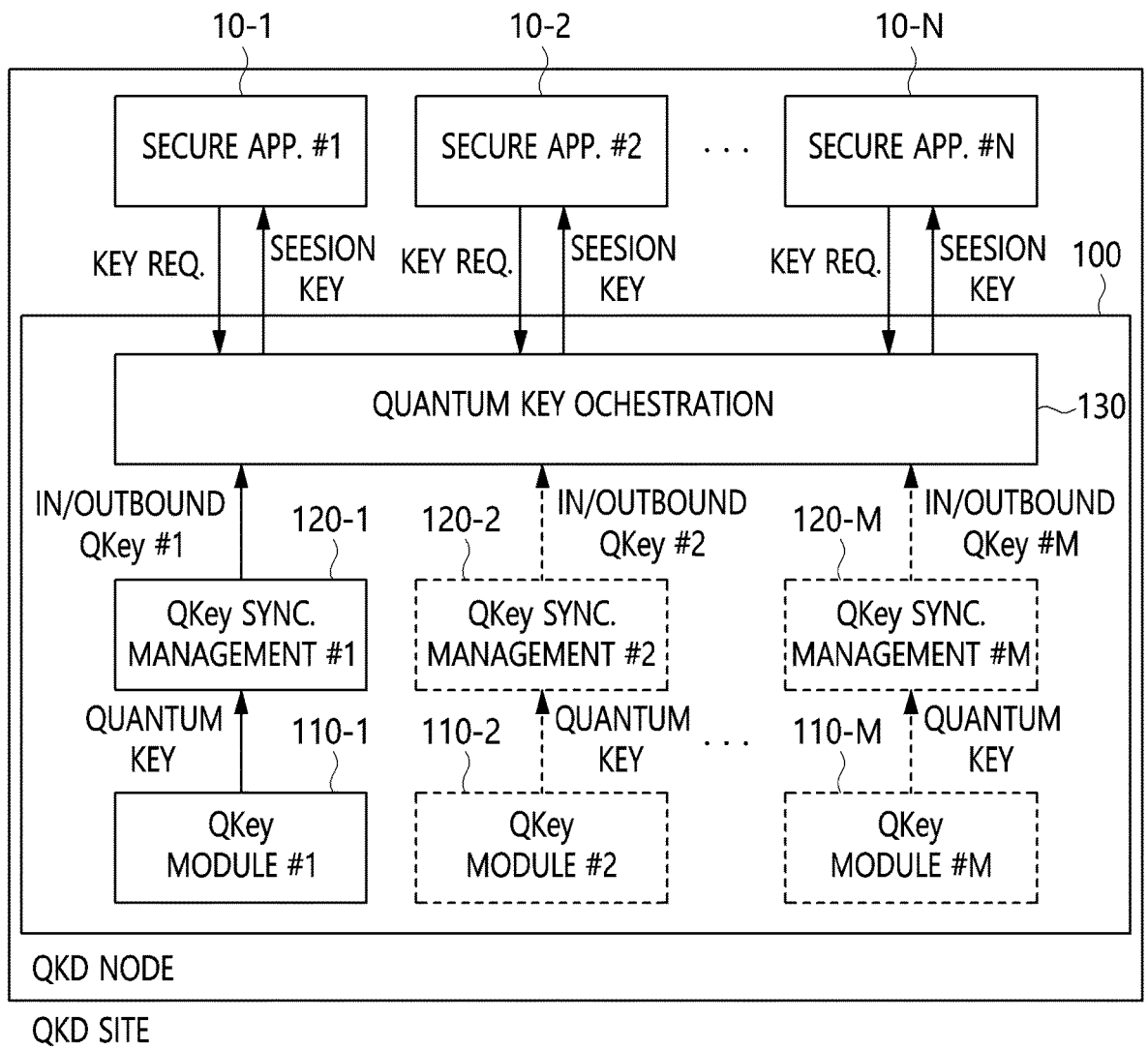
FIG. 3 is a schematic block diagram of a quantum key distribution node apparatus including multiple quantum key distribution modules and multiple quantum key synchronization management modules according to an embodiment.

FIG. 2 is a schematic block diagram of a quantum key distribution network system according to an embodiment, and FIG. 3 is a schematic block diagram of a quantum key distribution node apparatus including multiple quantum key distribution modules and multiple quantum key synchronization management modules according to an embodiment.

Referring to FIG. 2, a quantum key distribution network system may include Quantum Key Distribution (QKD) nodes 100a and 100b and Secure Applications 10a and 10b.

Here, the QKD node 100a and the secure application 10a may be located in a QKD site A, and the QKD node 100b and the secure application 10b may be located in a QKD site B. The QKD site A and the QKD site B are securely managed quantum key distribution sites and are connected with each other, whereby a quantum key distribution network over which a quantum key is transmitted may be formed.

In the two QKD sites A and B, the QKD nodes 100a and 100b are connected with the respective secure applications 10a and 10b. Here, one or more secure applications may be connected with a QKD node.

That is, referring to FIG. 3, one or more secure applications 10-1, 10-2, . . . , 10-N may be connected with a single QKD node 100.

The secure applications 10a and 10b may use secure applications for links, secure applications for video calls, Virtual Private Networks (VPNs), or the like depending on the purposes thereof, and may acquire a master key from the respective QKD nodes 100a and 100b, thereby performing cryptographic communication therebetween.

That is, the secure application 10a in the site A may acquire a master key and a master key ID from a quantum key orchestration module 130a, and may transmit the master key ID to the secure application 10b in the site B through a public channel. The secure application 10b in the site B requests a key from a quantum key orchestration module 130b in the site B using the received master key ID, thereby acquiring the master key.

Accordingly, the two secure applications 10a and 10b possess the same master key and the same master key ID and perform cryptographic communication therebetween using a session key generated using the master key.

Referring again to FIG. 2, the QKD nodes 100a and 100b may include respective QKD modules 110a and 110b, respective quantum key synchronization management modules 120a and 120b, and respective quantum key orchestration modules 130a and 130b.

The QKD modules 110a and 110b may be connected with each other through a QKD link. Here, the QKD link may include a quantum channel for transmitting a photon in a quantum state and a public channel for transmitting decoy information, basis information, and the like.

The QKD modules 110a and 110b form a set comprising a sender and a receiver connected in a P2P manner, and generate a quantum key and a quantum key ID shared therebetween by acquiring a raw key from a random value, which is generated by the transmission device and measured by the reception device, by acquiring a shifted key from the raw key, and by performing privacy amplification.

Here, the QKD modules 110a and 110b may use any of various quantum key distribution protocols, such as BB-84 QKD, MDI QKD, and the like.

The QKD modules 110a and 110b deliver the quantum key and the quantum key ID to the quantum key synchronization management modules 120a and 120b based on the quantum key distribution protocol.

Here, each of the QKD nodes 100a and 100b may operate one or more QKD modules 110a or 110b.

Here, a number of QKD modules (110a or 110b) equal to the number of quantum key synchronization management modules may be connected with the quantum key synchronization management modules (120a or 120b) in a P2P manner.

That is, as shown in FIG. 3, a single QKD node 100 may include a single quantum key orchestration module 130, and multiple QKD modules 110-1, 110-2, . . . , 110-M equal to the number of quantum key synchronization management modules 120-1, 120-2, . . . , 120-M may be connected therewith in a P2P manner in the QKD node 100.

The quantum key synchronization management modules 120a and 120b store the quantum keys and the quantum key IDs, provided by the QKD modules 110a and 110b, as an inbound quantum key and an outbound quantum key in a distributed manner.

Specifically, the quantum key synchronization management modules 120a and 120b may include respective input quantum key buffers 121a and 121b, respective quantum key buffer management modules 123a and 123b, respective inbound quantum key buffers 127a and 127b, and respective outbound quantum key buffers 125a and 125b.

The input quantum key buffers 121a and 121b store the quantum keys and quantum key IDs delivered from the respective QKD modules 110a and 110b. These serve in buffering, because the rate at which the QKD modules 110a and 110b generate quantum keys is not constant.

The quantum key buffer management modules 123a and 123b store the quantum keys and the quantum key IDs, stored in the input quantum key buffers 121a and 121b, in the inbound quantum key buffers 127a and 127b and the outbound quantum key buffers 125a and 125b. The inbound quantum key buffers 127a and 127b and the outbound quantum key buffers 125a and 125b are used in order to deliver the quantum key to the quantum key orchestration modules 130a and 130b.

Similar to the QKD modules, the quantum key synchronization management modules 120a and 120b are classified so as to take a sender role or a receiver role depending on the QKD modules 110a and 110b connected therewith.

For example, the quantum key synchronization management module 120a in the site A illustrated in FIG. 2 may take a sender role, and the quantum key synchronization management module 120b in the site B may take a receiver role.

The quantum key synchronization management module 120a, which serves as a sender, reads the quantum key and quantum key ID from the input quantum key buffer 121a and stores the same in the outbound quantum key buffer 125a and the inbound quantum key buffer 127a such that they are neither empty nor overflowing. Then, the quantum key synchronization management module 120a transmits the information stored in the outbound quantum key buffer 125a and the inbound quantum key buffer 127a to the quantum key synchronization management module 120b in the site B, which serves as a receiver. Then, the quantum key buffer management module 123b in the site B, which serves as a receiver, reads a quantum key and a quantum key ID from the input quantum key buffer 121b using the received information and stores the same in the outbound quantum key buffer 125b and the inbound quantum key buffer 127b.

Accordingly, the quantum key and the quantum key ID that are the same as the quantum key and the quantum key ID stored in the outbound quantum key buffer 125a in the site A are stored in the inbound quantum key buffer 127b in the site B. Similarly, the quantum key and the quantum key ID that are the same as the quantum key and the quantum key ID stored in the inbound quantum key buffer 127a in the site A are stored in the outbound quantum key buffer 125b in the site B.

The quantum keys and quantum key IDs stored in the outbound quantum key buffers 125a and 125b and the inbound quantum key buffers 127a and 127b of the quantum key synchronization management modules 120a and 120b are delivered to the quantum key orchestration modules 130a and 130b at the upper level.

The quantum key orchestration modules 130a and 130b deliver a master key generated based on a random number to the respective secure applications 10a and 10b connected therewith in response to requests from the secure applications 10a and 10b for the master key, and encrypt the generated master key with the quantum key and transmit the same to the quantum key orchestration module in the counterpart site. Accordingly, the two quantum key orchestration modules 130a and 130b may share the same master key.

Specifically, the quantum key orchestration modules 130a and 130b may include respective master key management modules 131a and 131b, respective encryption modules 133a and 133b, respective decryption modules 135a and 135b, respective true random number generators 137a and 137b, and respective secure application interfaces 139a and 139b.

The encryption modules 133a and 133b and the decryption modules 135a and 135b use an exclusive-OR operation or a block cipher.

Here, an exclusive-OR operation may be used when the number of keys that are generated at the quantum key generation rate is greater than the number of keys required by a secure application. Also, because a one-time pad (OTP) is used, the information-theoretic security of the quantum key may be ensured.

Also, when a block cipher is used, a greater number of master keys than the number of keys capable of being generated at the quantum key generation rate may be supplied to the secure application.

The true random number generators 137a and 137b generate unpredictable random numbers using a quantum random number generator or the like, thereby generating the master key to be delivered to the secure applications 10a and 10b.

The secure application interfaces 139a and 139b serve as physical and logical interfaces with the secure applications 10a and 10b, and function to receive Application Programming Interface (API) instructions, which are logical interfaces delivered through physical interfaces, and to interpret and process the instructions.

The master key management modules 131a and 131b provide the master key and the master key ID to the respective secure applications 10a and 10b by controlling the respective secure application interfaces 139a and 139b, the respective encryption modules 133a and 133b, the respective decryption modules 135a and 135b, and the respective true random number generators 137a and 137b, and transmit and receive the encrypted master key therebetween in order to enable the master key to be shared between the secure applications 10a and 10b.

To this end, each of the master key management modules 131a and 131b receives the outbound and inbound quantum keys and the quantum key IDs corresponding to the outbound and inbound quantum keys from the one or more quantum key synchronization management modules 120a or 120b.

Also, upon receiving a master key request API instruction from the secure application interface 139a or 139b, the master key management module 131a or 131b processes the instruction.

Also, each of the master key management modules 131a and 131b may communicate with the master key management module in the counterpart site, which is connected in a P2P manner.

Also, the master key management modules 131a and 131b may manage routing tables corresponding to the respective sites.

Also, the master key management modules 131a and 131b manage the IDs of the secure applications connected with the respective sites.

Also, the master key management modules 131a and 131b may manage the access privileges of a security officer.

Also, the master key management modules 131a and 131b may perform secure communication with the secure applications.

A method for sharing a master key for cryptographic communication in the above-described quantum key distribution network system illustrated in FIG. 2 will be described below.

Figure 4:
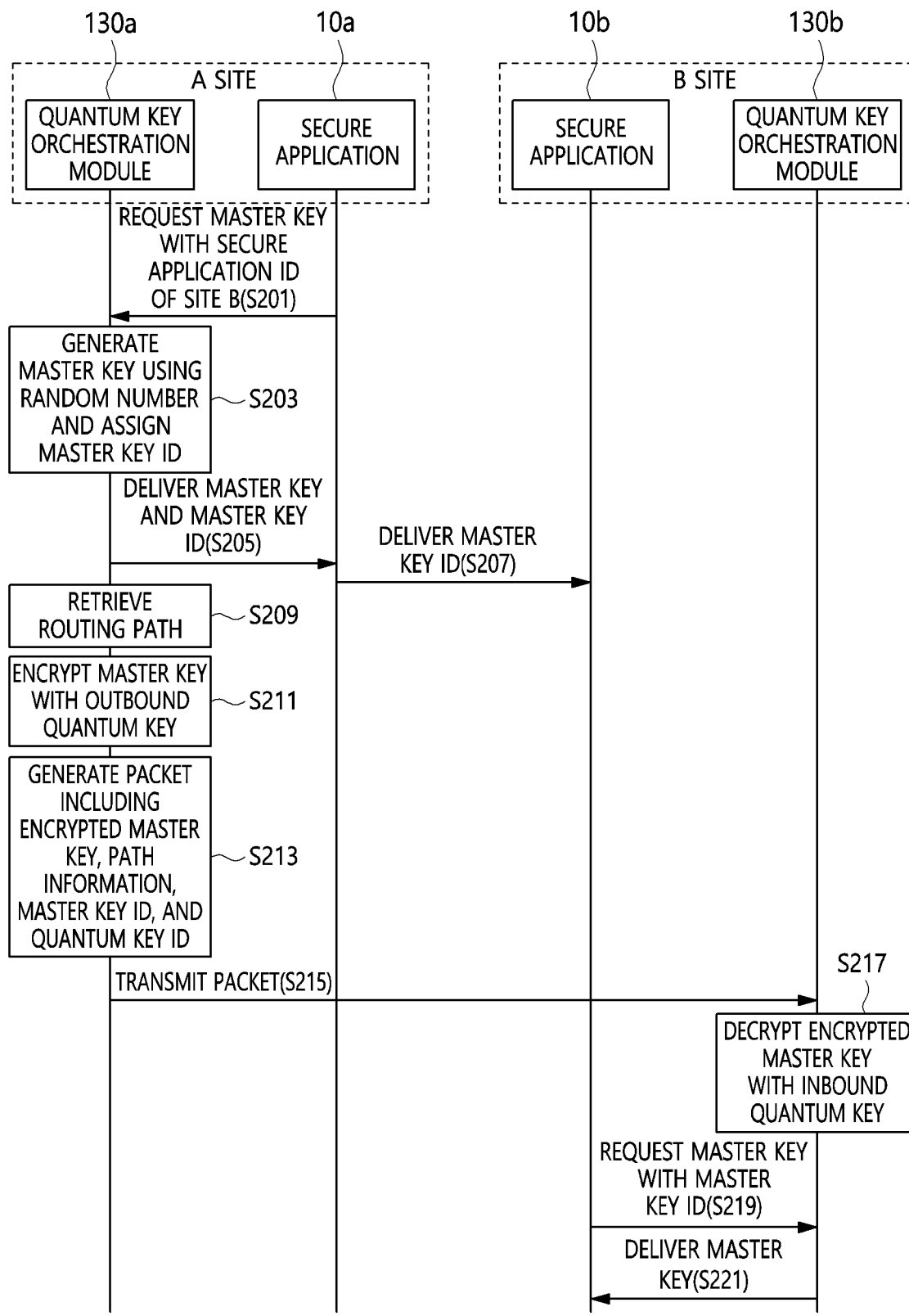
FIG. 4 is a signal flowchart for explaining a method for sharing a master key and a master key ID for cryptographic communication between a quantum key distribution site A and a quantum key distribution site B that are connected in a point-to-point (P2P) manner according to an embodiment.

FIG. 4 is a signal flowchart for explaining a method for sharing a master key and a master key ID for cryptographic communication in a QKD site A and a QKD site B, which are connected in a P2P manner, according to an embodiment.

Referring to FIG. 4, in order to perform cryptographic communication with the secure application 10b of the site B, the secure application 10a of the site A requests a master key from the quantum key orchestration module 130 of the site A using the ID of the secure application 10b of the site B as a parameter at step S201.

In response thereto, the quantum key orchestration module 130a of the site A generates a master key using a random number and assigns an ID to the generated master key at step S203. That is, the secure application interface 139a of the quantum key orchestration module 130 receives the master key request instruction from the secure application 10a, interprets the same, and delivers information thereabout to the master key management module 131a. The master key management module 131a generates a random number to be used as a master key using the true random number generator 137a.

Then, the quantum key orchestration module 130a of the site A delivers the master key and the master key ID to the secure application 10a of the site A at step S205. That is, the master key management module 131a delivers the master key and the master key ID to the secure application interface 139a, and the secure application interface 139a delivers the master key and the master key ID to the secure application 10a in response to the master key request instruction from the secure application 10a.

Then, the secure application 10a of the site A transmits the master key ID to the secure application 10b of the site B through a public channel at step S207.

Meanwhile, the quantum key orchestration module 130a of the site A retrieves a routing path using the routing table therein and the secure application ID at step S209. Here, the routing path may be the path from the site A to the site B.

Accordingly, the quantum key orchestration module 130a of the site A encrypts the master key with the outbound quantum key stored in the outbound quantum key buffer connected with the site B at step S211.

Then, the quantum key orchestration module 130a of site A generates a packet including the encrypted master key, the path information, the master key ID, and the quantum key ID at step S213 and transmits the generated packet to the quantum key orchestration module 130b of the site B at step S215.

The quantum key orchestration module 130b of the site B checks he quantum key ID in the received packet, decrypts the encrypted master key with the inbound quantum key stored in the inbound quantum key buffer 127b connected with the site A, and stores the decrypted master key along with the master key ID at step S217.

Meanwhile, the secure application 10b of the site B requests a master key from the quantum key orchestration module 130b of the site B using the master key ID received from the secure application 10a as a parameter at step S219.

The quantum key orchestration module 130b delivers the stored master key to the secure application 10b at step S221.

Through the above-described process, the secure application 10a of the site A and the secure application 10b of the site B may share the same master key and the same master key ID, and may perform cryptographic communication using the master key and the master key ID shared therebetween.

For the convenience of description, an example in which the secure application 10a of the site A first makes a request for a master key is illustrated in FIG. 4, but the present invention is not limited thereto. That is, according to an embodiment, even when the secure application 10b of the site B first makes a request for a master key, the master key may be shared through the same process.

Figure 5:
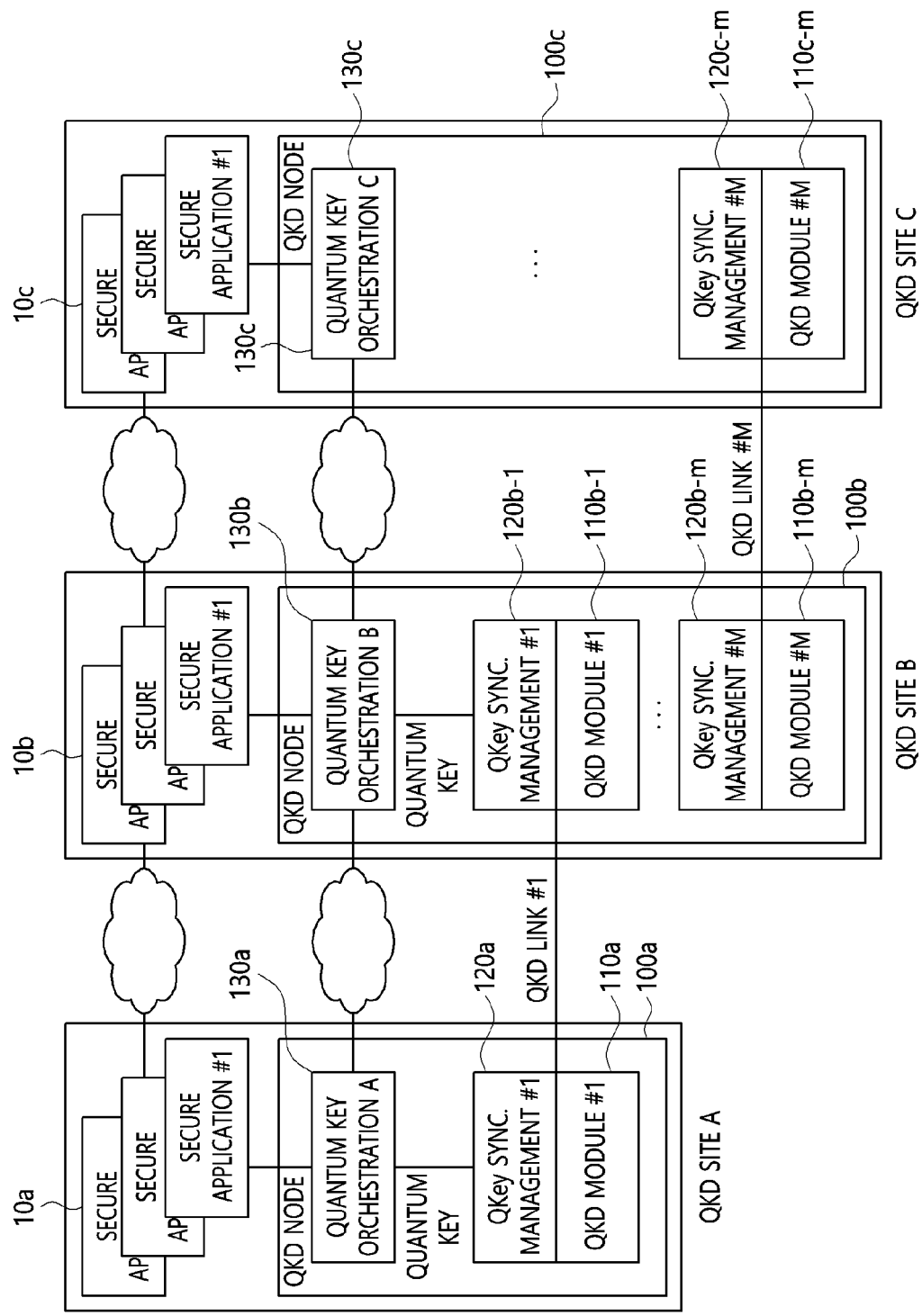
FIG. 5 is a schematic block diagram of a quantum key distribution network according to another embodiment.

FIG. 5 is a schematic block diagram of a quantum key distribution network according to an embodiment.

Referring to FIG. 5, a quantum key distribution network system includes three or more QKD sites, that is, a QKD site A, a QKD site B, and a QKD site C, unlike the quantum key distribution network system including only two QKD sites as shown in FIG. 2, and the QKD sites are connected with each other, whereby a quantum key distribution network over which a quantum key is transmitted may be formed.

When the quantum key distribution network is formed as shown in FIG. 5, the QKD node 100b including two or more QKD modules 110b-1, 110b-m may relay a key. Through the key relay by the QKD node 100b, the secure application 10a of the site A may perform cryptographic communication with the secure application 10c of the site C.

A method for sharing a master key for cryptographic communication in the above-described quantum key distribution network system illustrated in FIG. 5 will be described below.

Figure 6:
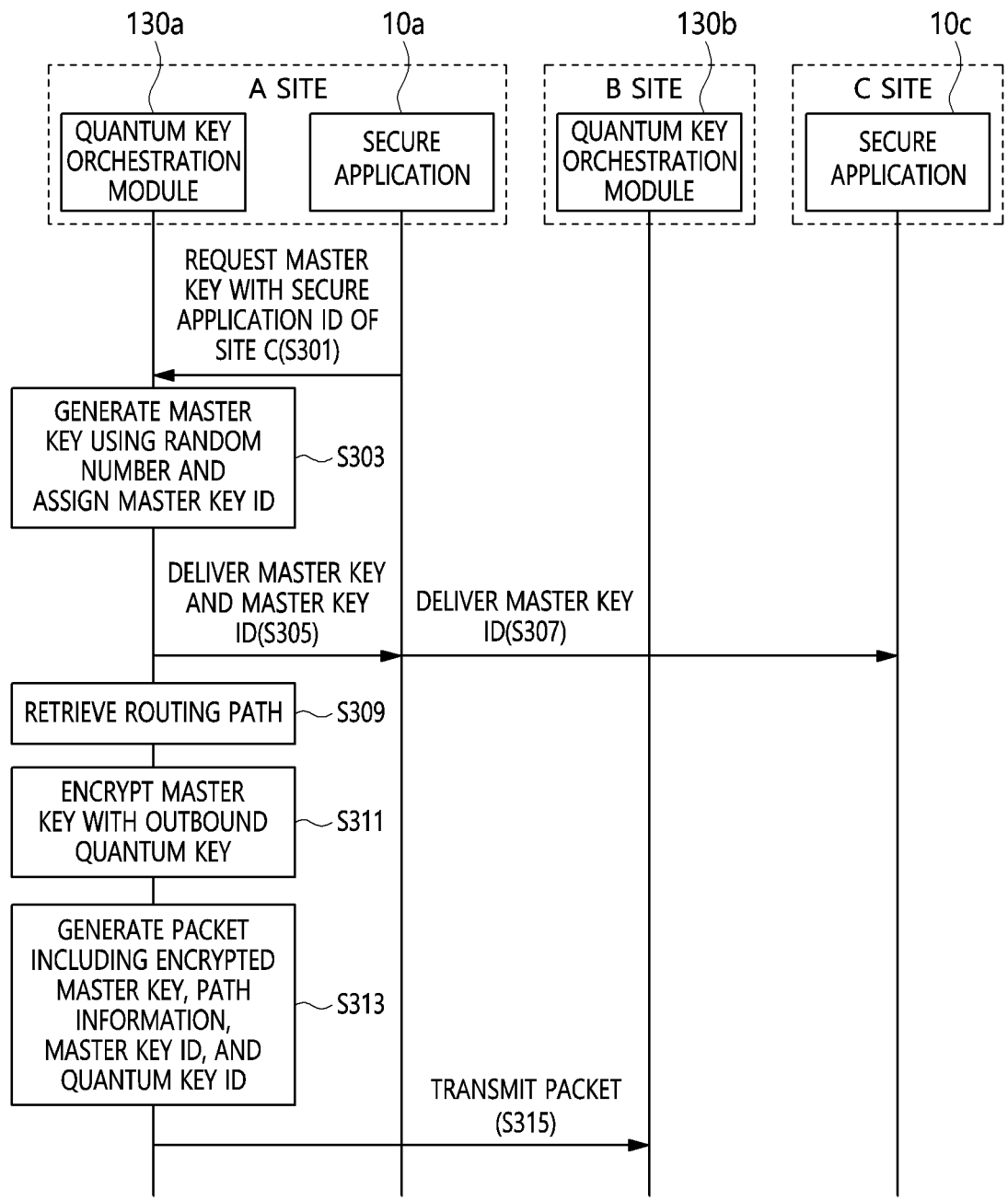
FIGS. 6 and 7 are signal flowcharts for explaining a method for sharing a master key and a master key ID for cryptographic communication between secure applications through the relay of a quantum key according to an embodiment.
Figure 7:
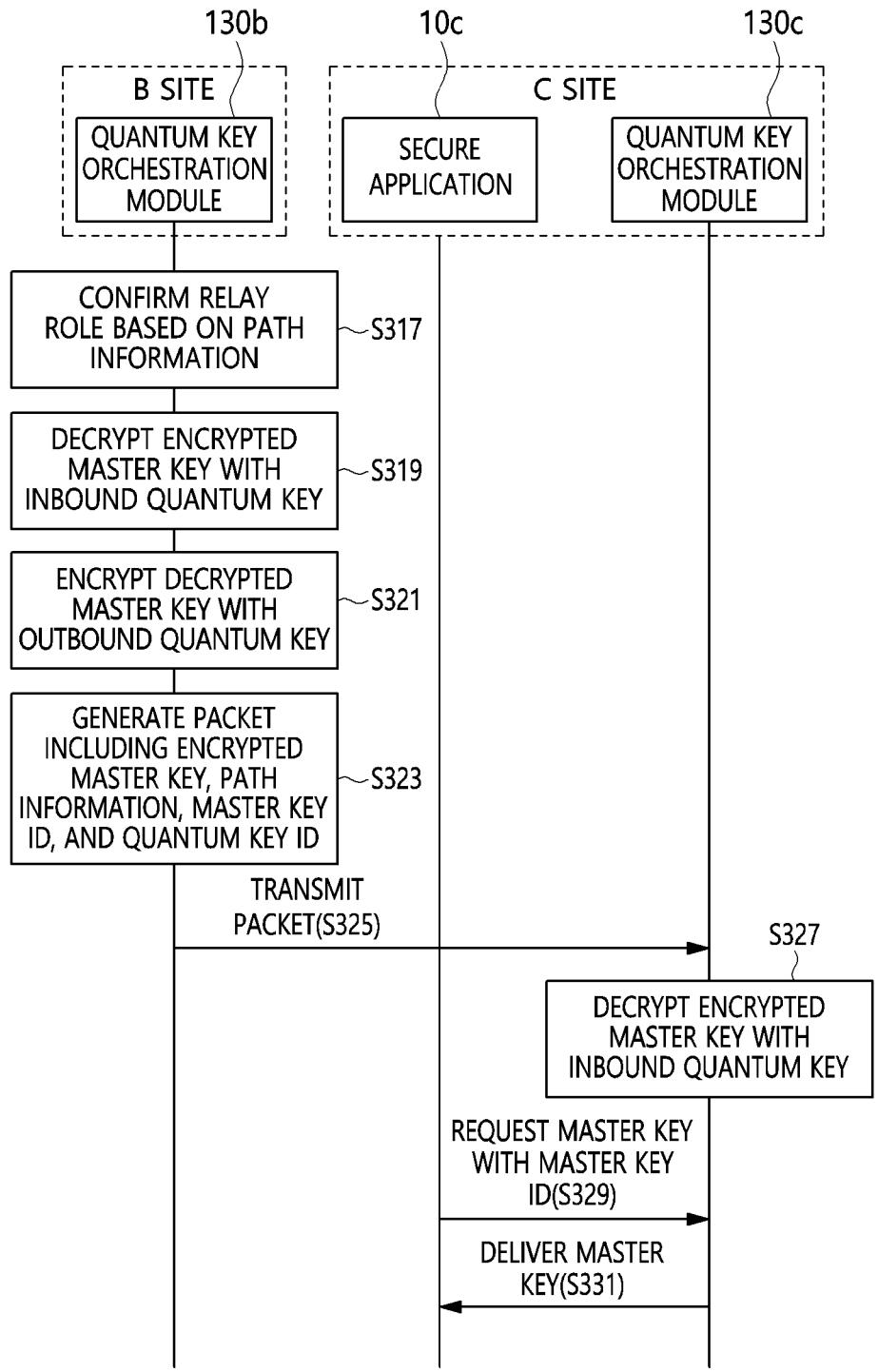

FIGS. 6 and 7 are signal flowcharts for explaining a method for sharing a master key and a master key ID for cryptographic communication between secure applications through the relay of a quantum key according to an embodiment. Referring to FIG. 6, the secure application 10a of the site A requests a master key from the quantum key orchestration module 130a of the site A using the ID of the secure application of the site C as a parameter at step S301.

The quantum key orchestration module 130a of the site A generates a master key using the true random number generator and assigns a unique master key ID to the generated master key at step S303.

Then, the quantum key orchestration module 130a of the site A provides the master key and the master key ID to the secure application 10a of the site A. The secure application 10a of the site A transmits the master key ID to the secure application 10c of the site C at step S307.

Meanwhile, the quantum key orchestration module 130a of the site A reads routing information, which is required for transmission of a master key packet, from a routing table using the ID of the secure application at step S309. Here, based on the read routing information, it is confirmed that it is necessary to pass through the site B in order to transmit the master key from the quantum key orchestration module 130a of the site A to the quantum key orchestration module 130c of the site C.

Accordingly, the quantum key orchestration module 130a of the site A encrypts the master key with the outbound quantum key pertaining to the site B at step S311.

The quantum key orchestration module 130a of the site A generates a packet including the encrypted master key, the path information (A→B→C), the master key ID, and the quantum key ID at step S313 and transmits the generated packet to the quantum key orchestration module 130b of the site B at step S315.

Referring to FIG. 7, the quantum key orchestration module 130b of the site B extracts the path information from the packet received from the site A, thereby confirming that it should relay a key at step S317.

Accordingly, the quantum key orchestration module 130b of the site B decrypts the encrypted master key with the inbound quantum key pertaining to the site A at step S319 in order to relay the key.

Then, the quantum key orchestration module 130b of the site B again encrypts the decrypted master key with the outbound quantum key pertaining to the site C at step S321.

The quantum key orchestration module 130b of the site B generates a packet including the encrypted master key, the path information (A→C), the master key ID, and the quantum key ID at step S323 and transmits the generated packet to the quantum key orchestration module 130c of the site C at step S325.

The quantum key orchestration module 130c of the site C confirms that the site C is the final destination through the path information included in the received packet at step S325.

Then, the quantum key orchestration module 130c of the site C decrypts the master key with the inbound quantum key pertaining to the site B and stores the master key and the master key ID at step S327.

Meanwhile, the secure application 10c of the site C requests a key from the quantum key orchestration module 130c of the site C using the master key ID as a parameter at step S329. The quantum key orchestration module 130c of the site C delivers the master key and the master key ID to the secure application 10c at step S331.

Through the above-described process, the secure application 10a of the site A and the secure application 10c of the site C may share the same master key and the same master key ID, and may perform cryptographic communication using the master key and the master key ID.

Meanwhile, according to an embodiment, secure applications connected with the same site as shown in FIG. 3 may perform cryptographic communication therebetween in the quantum key distribution network system. Because the conventional quantum key distribution network system is configured such that the quantum key generated by a QKD module is provided to a secure application and the quantum key is required to be synchronized, the secure applications connected with the same QKD node are not able to perform cryptographic communication therebetween. However, the method of using a random number as a master key according to an embodiment additionally enables cryptographic communication between secure applications connected with the same QKD node.

Figure 8:
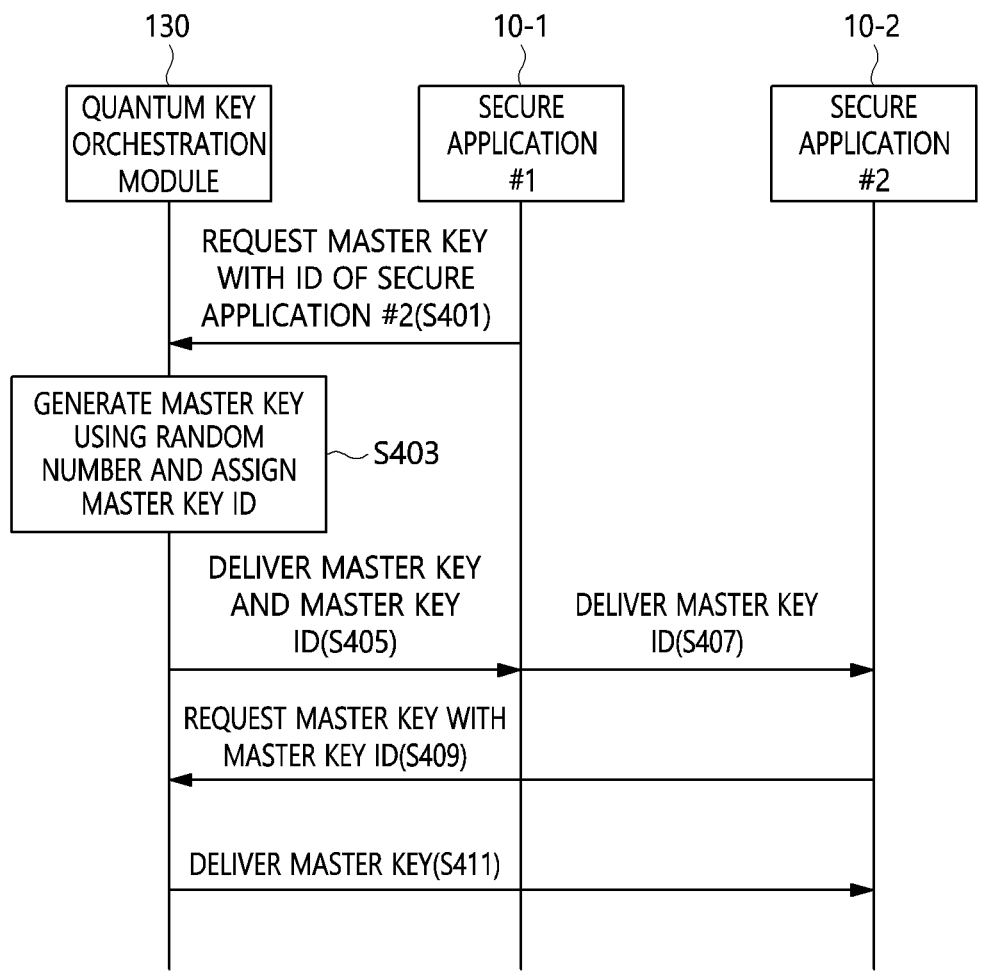
FIG. 8 is a signal flowchart for explaining a method for sharing a master key and a master key ID for cryptographic communication between secure applications in the same quantum key distribution site according to an embodiment.

FIG. 8 is a signal flowchart for explaining a method for sharing a master key and a master key ID for cryptographic communication between secure applications in the same QKD site according to an embodiment.

Referring to FIG. 8, in order for the secure application #1 10-1 to perform cryptographic communication with the secure application #2 10-2 connected with the same QKD node with which the secure application #1 10-1 is connected, the secure application #1 10-1 requests a master key from the quantum key orchestration module 130 of the QKD node using the ID of the secure application #2 as a parameter at step S401.

The quantum key orchestration module 130 checks the ID of the secure application, thereby confirming that the secure application is included in the same QKD node. Then, the quantum key orchestration module 130 generates a master key using a random number and assigns a master key ID thereto at step S403.

Then, the quantum key orchestration module 130 delivers the master key and the master key ID to the secure application #1 10-1 at step S405.

The secure application #1 10-1 delivers the master key ID received from the quantum key orchestration module 130 to the secure application #2 10-2 at step S407.

The secure application #2 10-2 requests a key from the quantum key orchestration module 130 using the master key ID at step S409.

The quantum key orchestration module 130 retrieves the master key using the master key ID and delivers the same to the secure application #2 10-2 at step S411.

The secure application #1 10-1 and the secure application #2 10-2 perform cryptographic communication with each other using the master key and the master key ID acquired from the quantum key orchestration module 130.

Meanwhile, group cryptographic communication between secure applications included in a quantum key distribution network system may be performed according to an embodiment. The group cryptographic communication may also be performed in a conventional quantum key distribution network system, but a very complicated structure and protocol are required in order to maintain synchronization of a quantum key. However, because an embodiment is configured to separate the synchronization of a quantum key from the synchronization of a master key in a quantum key orchestration module, the group cryptographic communication may be performed using a simple protocol.

Figure 9:
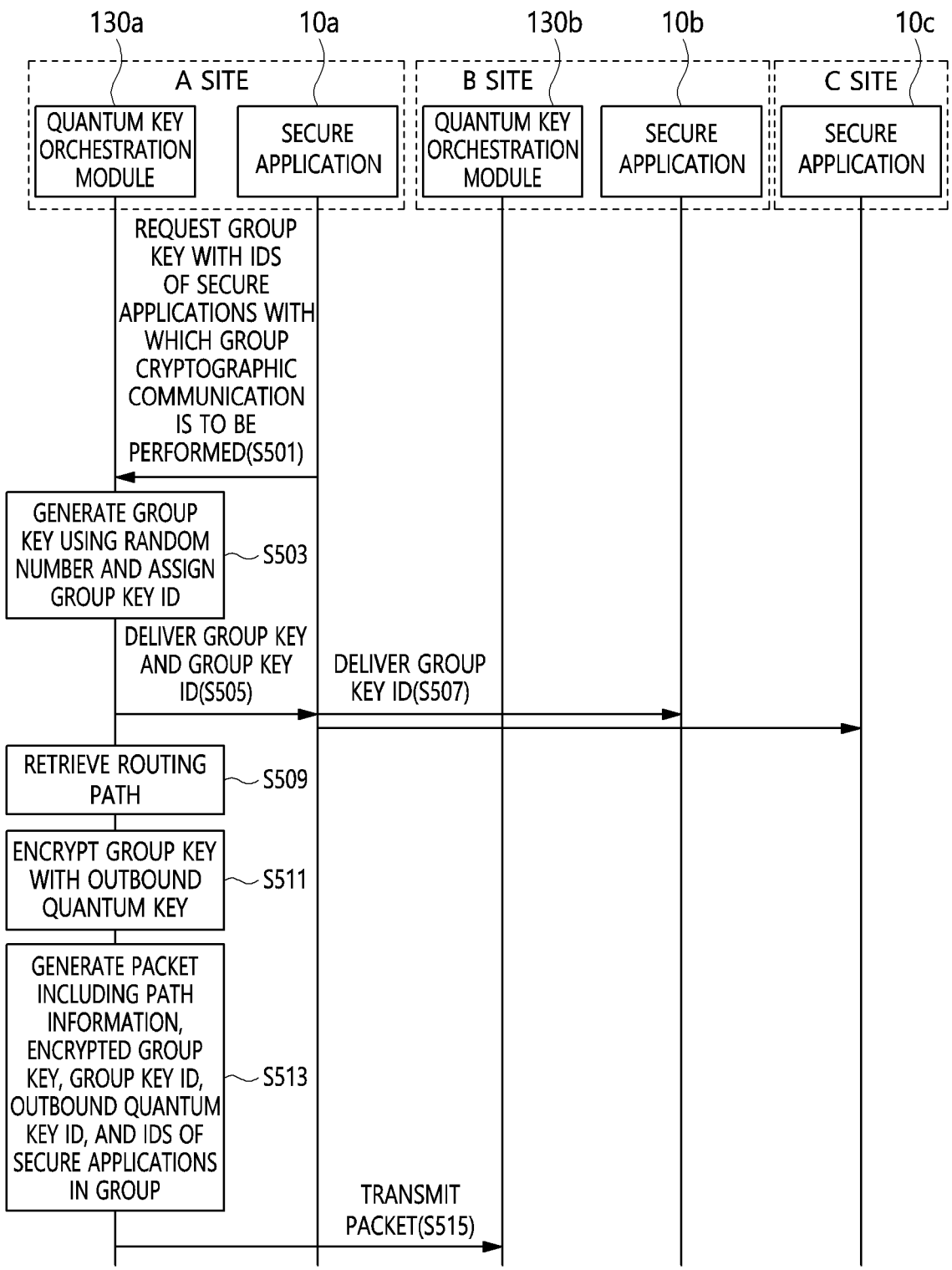
FIGS. 9 and 10 are signal flowcharts for explaining a method for sharing a group key and a group key ID for cryptographic communication between secure applications in a quantum key distribution network according to an embodiment.
Figure 10:
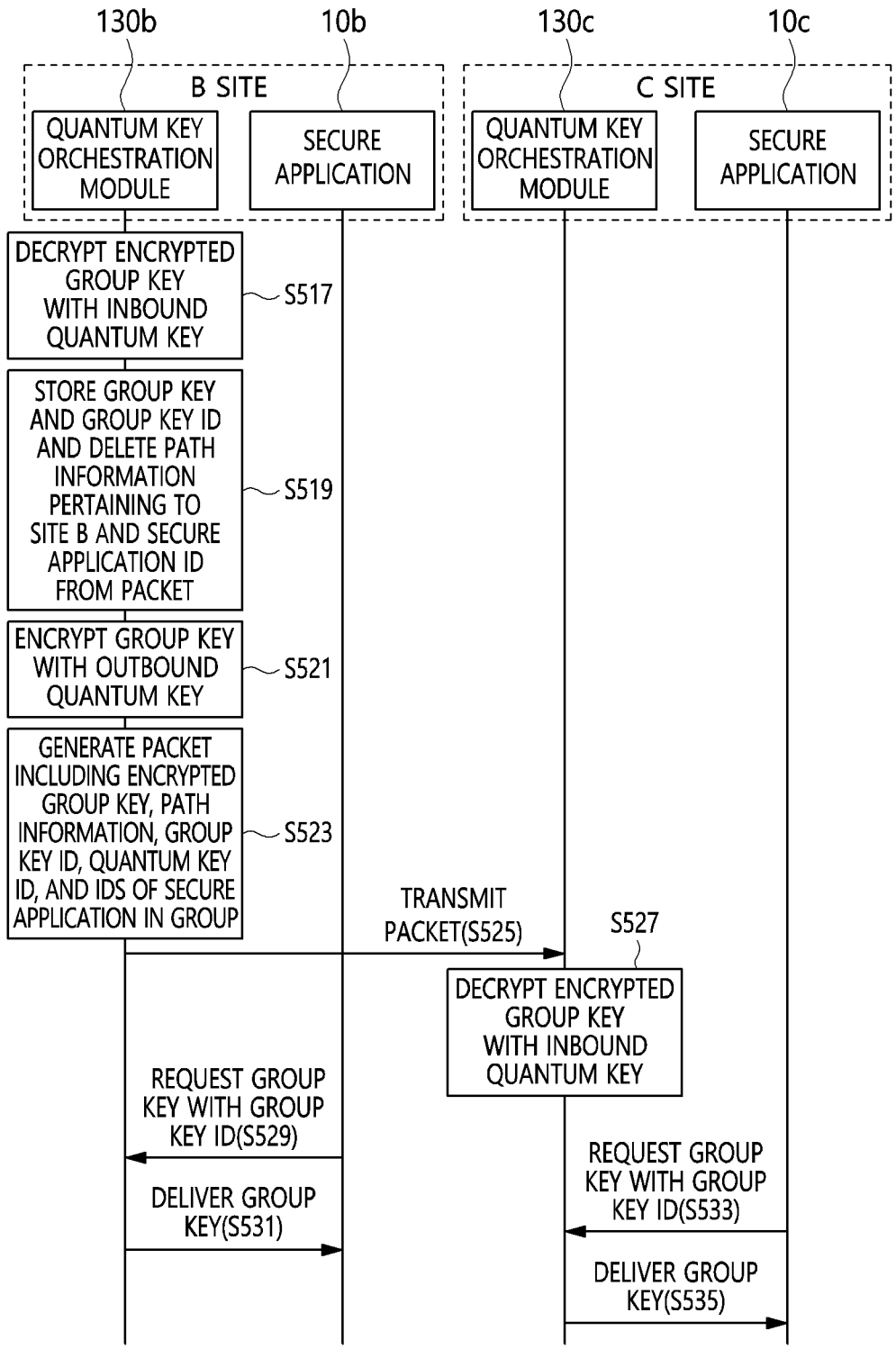

FIGS. 9 and 10 are signal flowcharts for explaining a method for sharing a group key and a group key ID for cryptographic communication between secure applications in a quantum key distribution network according to an embodiment.

Referring to FIG. 9, in order to perform group cryptographic communication with multiple secure applications included in a quantum key distribution network, the secure application 10a of the site A requests a group key from the quantum key orchestration module 130a of the site A using the IDs of the secure applications with which the secure application 10a will perform group cryptographic communication as parameters at step S501.

The quantum key orchestration module 130a generates a group key using a random number, assigns a group key ID thereto at step S503, and delivers the group key and the group key ID to the secure application 10a at step S505.

The secure application 10a of the site A that starts the first group cryptographic communication transmits the group key ID to all of the secure applications 10b and 10c with which the secure application 10a performs group cryptographic communication at step S507.

The quantum key orchestration module 130a retrieves the full path along which the group key is to be transmitted using the IDs of the secure applications at step S509.

The quantum key orchestration module 130a of the site A encrypts the group key with the outbound quantum key pertaining to the site B at step S511.

Then, the quantum key orchestration module 130a of the site A generates a packet including the encrypted group key, path information, the group key ID, the outbound quantum key ID, and the IDs of the secure applications in the group at step S513 and transmits the generated packet to the quantum key orchestration module 130b of the site B at step S515.

Referring to FIG. 10, the quantum key orchestration module 130b of the site B decrypts the group key included in the packet with the inbound quantum key at step S517.

The quantum key orchestration module 130b of the site B checks whether the IDs of the secure applications of the group in the packet include the ID of the secure application in the site B, stores the group key and the group key ID when the group includes the secure application in the site B, and deletes the path information pertaining to the site B and the ID of the secure application in the site B from the packet at step S519.

When delivery to the site C is required, the quantum key orchestration module 130b of the site B encrypts the group key with the outbound quantum key pertaining to the site C at step S521. Then, the quantum key orchestration module 130b of the site B generates a packet including the encrypted group key, the transmission path, the group key ID, the quantum key ID, and the IDs of the secure applications in the group at step S523 and transmits the packet to the quantum key orchestration module 130c of the site C at step S525.

The quantum key orchestration module 130c of the site C decrypts the group key with the inbound quantum key when it receives the packet, and stores the decrypted group key and the group key ID at step S527.

Accordingly, the quantum key orchestration modules 130a, 130b and 130c, with which all of the secure applications participating in group communication are connected, share the same group key and the same group key ID.

The secure applications 10b and 10c participating in group cryptographic communication request the group key from the quantum key orchestration modules 130b and 130c, with which the secure applications 10b and 10c are respectively connected, using the group key ID as a parameter at steps S529 and S533, thereby acquiring the group key at steps S531 and S535.

Here, in order to perform group cryptographic communication, multiple paths may be required, depending on the structure of the quantum key distribution network. For example, when delivery from the site B to another path, other than the path to the site C, is required, the quantum key orchestration module of the site A generates packets for all of the multiple paths and transmits the same to the site B, and the site B checks the paths from the respective packets and transmits the packets to the corresponding paths.

Meanwhile, because the quantum key generation rate of a QKD module is generally several to tens of Kbps, it is time-consuming to share a large number of master keys in the conventional quantum key distribution network system, which is configured to directly provide quantum keys to secure applications. For example, it takes about 233 hours to share 1 GB quantum keys in the quantum key distribution network system having a quantum key generation rate of 10 Kbps.

For example, according to an embodiment, when the secure application 10a of the site A illustrated in FIG. 2, FIG. 3 or FIG. 5 requests 1 GB of master keys from the quantum key orchestration module 130a, the quantum key orchestration module 130a may generate 1 GB of random numbers to be used as the master keys, encrypt the master keys with the outbound quantum key based on a block cipher, and transmit the same to the quantum key orchestration module 130b of the site B.

The quantum key orchestration module 130b of the site B may decrypt the master key with the inbound quantum key based on a block cipher.

The quantum key orchestration module 130a of the site A and the quantum key orchestration module 130b of the site B may transmit a large number of master keys to the respective secure applications. Generally, a block cipher has high performance, and it doesn't take much time to transmit 1 GB through a public channel.

Figure 11:
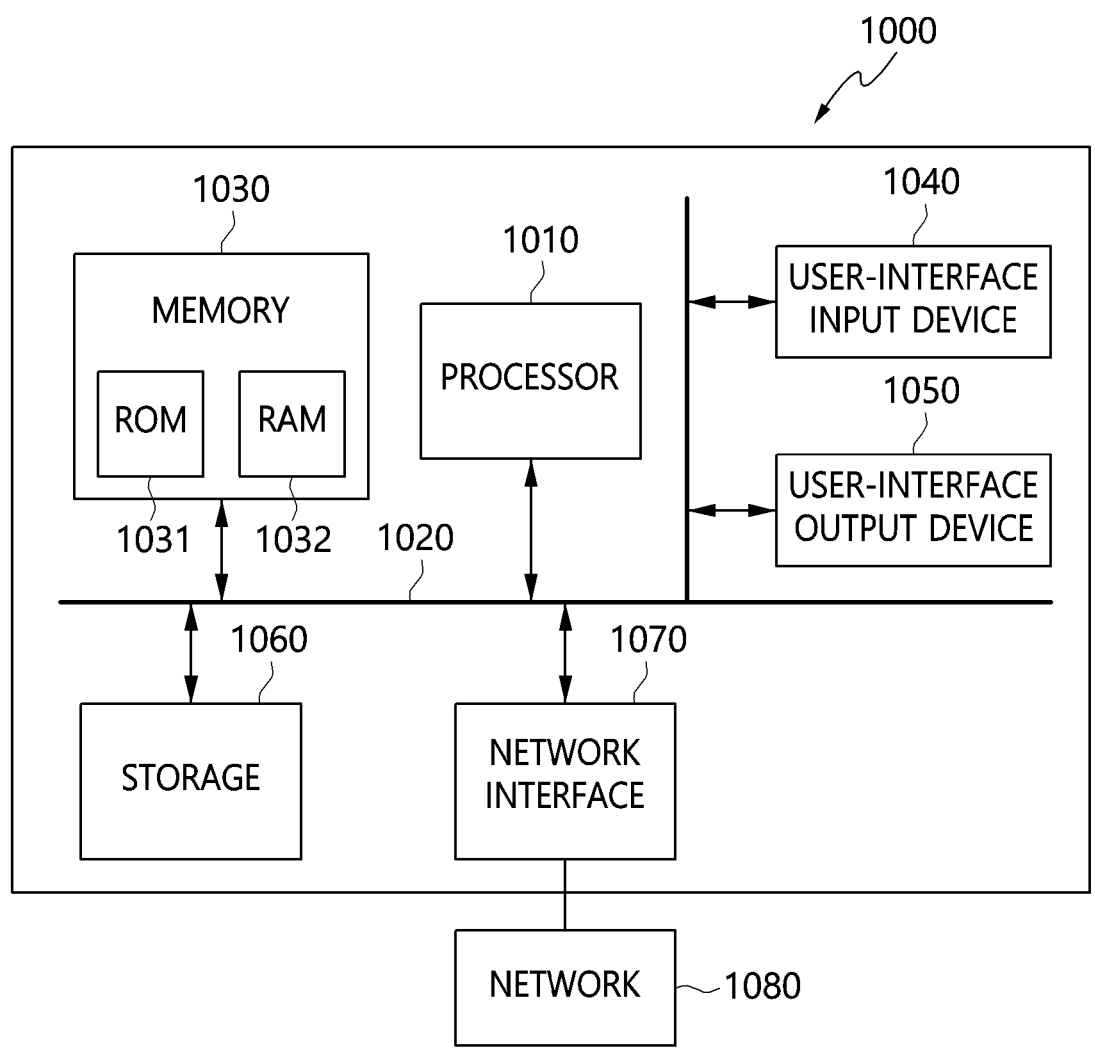
FIG. 11 is a view illustrating a computer system configuration according to an embodiment.

FIG. 11 is a view illustrating a computer system configuration according to an embodiment.

The QKD node apparatus according to an embodiment may be implemented in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected with a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a non-volatile medium, a detachable medium, a non-detachable medium, a communication medium, and an information delivery medium. For example, the memory 1030 may include ROM 1031 or RAM 1032.

According to an embodiment, because it is not necessary to determine in advance whether a secure application takes a master role or a slave role, any secure application included in a quantum key distribution network system is allowed to first make a key request. Therefore, the secure applications may operate more naturally and may be simply managed.

According to an embodiment, under the condition in which multiple secure applications are operated by being connected with a quantum key distribution node, the quantum key distribution node is able to immediately process a key-sharing transaction with a secure application without blocking a key request therefrom even while it processes a key-sharing transaction with another secure application, whereby the performance of processing key requests may be improved.

According to an embodiment, it may be easier to implement the relay of a key. A random number is generated and is used as a master key without delivering a quantum key to a secure application, and the quantum key is only used for encrypting the master key. Accordingly, it is easy to maintain synchronization of the quantum key between quantum key distribution nodes. Similarly, when a key is relayed, because the same quantum key is used and synchronization is maintained between the two quantum key distribution nodes, the key may be simply relayed.

According to an embodiment, cryptographic communication between secure applications in the same site may be performed. When cryptographic communication between secure applications in the same site is performed in a conventional quantum key distribution network system, because it is necessary to deliver a quantum key generated by a quantum key distribution module, it is very complex to maintain synchronization of the quantum key. In contrast, according to an embodiment, because a random number generated by a quantum key orchestration module is used as a master key, a quantum key is not consumed and it is not necessary to synchronize the quantum key. Therefore, cryptographic communication may be easily implemented.

According to an embodiment, group cryptographic communication using a group key may be implemented. A group key is generated using a random number and is shared, rather than using a quantum key as the group key, and the quantum key may be managed such that synchronization thereof is not broken. Therefore, based on a protocol in which a route is set based on a routing table and in which the group key is transmitted by an intermediate quantum key distribution node, group cryptographic communication using the group key may be performed.

According to an embodiment, a large number of master keys may be generated and delivered to a secure application. Encryption/decryption modules in a quantum key orchestration module are used for a block cipher, and a large number of master keys may be encrypted with a quantum key and transmitted through a public channel. In the conventional quantum key distribution network system configured to directly deliver a quantum key to a secure application, it takes a lot of time to deliver a large number of master keys to the secure application due to the low quantum key generation rate. However, according to an embodiment, because a quantum key is not used as a master key, a large number of master keys may be quickly shared regardless of the quantum key generation rate.

Although the embodiments of the present invention have been described with reference to the accompanying drawings, those skilled in the art will appreciate that the present invention may be practiced in other specific forms without changing the technical spirit or essential features of the present invention. Therefore, the embodiments described above are illustrative in all aspects and should not be understood as limiting the present invention.

What is claimed is:

1. A quantum key distribution (QKD) node apparatus, comprising:
   at least one processor, and a memory having instructions stored thereon, which, when executed by the at least one processor, cause the at least one processor to perform:
   a QKD module for generating quantum keys and quantum key IDs;
   a quantum key synchronization management module for storing the quantum keys and the quantum key IDs generated by the QKD module as an outbound quantum key and an inbound quantum key in a distributed manner and for sharing the outbound quantum key and the inbound quantum key with a second QKD node apparatus; and
   a quantum key orchestration module for delivering a master key, generated using a random number, and a master key ID to a secure application connected therewith when the master key is requested by the secure application using an ID of a second secure application, and for transmitting a packet including the master key encrypted with the outbound quantum key shared with the second QKD node apparatus connected with the second secure application, the master key ID, and the quantum key ID to the second QKD node apparatus,
   wherein the QKD modules equal in number to a number of quantum key synchronization management modules are connected therewith in a one-to-one manner, and each of the QKD module and the quantum key synchronization management module is one or more in number,
   wherein the quantum key orchestration module is configured to:
   retrieve a path corresponding to the ID of the second secure application based on an internal routing table, and
   transmit a packet, including the master key encrypted with an outbound quantum key shared with a relay QKD node apparatus, the master key ID, information about the path, and a quantum key ID, to the relay QKD node apparatus when the relay QKD node apparatus for relaying is present on the path.

2. The QKD node apparatus of claim 1, wherein, when the second secure application is connected with the QKD node apparatus, the quantum key orchestration module delivers the master key corresponding to the master key ID when a key request is made by the second secure application using the master key ID.

3. The QKD node apparatus of claim 1, wherein, when a group key is requested by the secure application connected with the QKD node apparatus using IDs of multiple secure applications as parameters, the quantum key orchestration module delivers the group key generated using a random number and a group key ID to the secure application, retrieves a path along which the group key is transmitted using an internal routing table and the IDs of the multiple secure applications, and transmits a packet including the group key encrypted with an outbound quantum key shared with a next QKD node apparatus on the path, the group key ID, information about the path, the IDs of the multiple secure applications, and a quantum key ID to the next QKD node apparatus on the path.

4. The QKD node apparatus of claim 1, wherein, when a large number of master keys is requested by the secure application connected with the QKD node apparatus, the quantum key orchestration module encrypts the large number of master keys with the outbound quantum key based on a block cipher.

5. A quantum key distribution (QKD) node apparatus, comprising:
   at least one processor, and a memory having instructions stored thereon, which, when executed by the at least one processor, cause the at least one processor to perform:
   a QKD module for generating quantum keys and quantum key IDs;
   a quantum key synchronization management module for storing the quantum keys and the quantum key IDs generated by the QKD module as an outbound quantum key and an inbound quantum key in a distributed manner and sharing the outbound quantum key and the inbound quantum key with a second QKD node apparatus; and
   a quantum key orchestration module for decrypting a master key included in a packet with the inbound quantum key shared with the second QKD node apparatus upon receiving the packet, including the encrypted master key, a master key ID, and the quantum key ID, from the second QKD node apparatus, and for delivering the master key corresponding to the master key ID to a secure application connected with the QKD node apparatus upon receiving the master key ID from the secure application, wherein the QKD modules equal in number to a number of quantum key synchronization management modules are connected therewith in a one-to-one manner, and each of the QKD module and the quantum key synchronization management module is one or more in number, wherein the quantum key orchestration module is configured to:

decrypt the encrypted master key with the inbound quantum key pertaining to the second QKD node apparatus when it is confirmed that the QKD node apparatus is required to relay the master key based on information about a path included in a packet upon receiving the packet from the second QKD node apparatus, encrypt the decrypted master key with an outbound quantum key shared with a third QKD node apparatus, which is a next QKD apparatus on the path, generate a packet including the encrypted master key, the information about the path, the master key ID, and a quantum key ID, and transmit the packet to the third QKD node apparatus.

6. The QKD node apparatus of claim 5, wherein:

when the packet includes a group key and IDs of multiple secure applications and when an ID of the secure application connected with the QKD node apparatus is included in the IDs of the multiple secure applications, the quantum key orchestration module stores the group key and a group key ID and deletes path information pertaining to the QKD node apparatus and the ID of the secure application connected with the QKD node apparatus from the packet.

7. The QKD node apparatus of claim 5, wherein, when the master key is present in a large number thereof, the quantum key orchestration module decrypts the master key based on a block cipher.

8. A quantum key distribution method, comprising:

delivering, by a quantum key distribution (QKD) node apparatus, a master key, generated using a random number, and a master key ID to a secure application connected with the QKD node apparatus in response to a request from the secure application for the master key, which is required for quantum cryptographic communication with a second secure application;

when the second secure application is a secure application connected with the QKD node apparatus, delivering, by the QKD node apparatus, the master key corresponding to the master key ID when the master key is requested by the second secure application with the master key ID; and when the second secure application is not a secure application connected with the QKD node apparatus, encrypting, by the QKD node apparatus, the master key with an outbound quantum key shared with a second QKD node apparatus connected with the second secure application, and delivering, by the QKD node apparatus, a packet including the encrypted master key, the master key ID, and a quantum key ID, to the second QKD node apparatus, wherein the delivering the packet to the second QKD node apparatus comprises:

when the second secure application is not a secure application connected with the QKD node apparatus, retrieving a routing path using an internal routing table and an ID of the second secure application; and when a relay QKD node apparatus is present on the routing path, encrypting the master key with an outbound quantum key shared with the relay QKD node apparatus and transmitting a packet including the master key, the master key ID, information about the routing path, and a quantum key ID to the relay QKD node apparatus, wherein when the relay QKD node apparatus receives the packet from the QKD node apparatus and confirms that the relay QKD node apparatus is required to relay the master key based on the information about the routing path included in the packet, the quantum key distribution method further comprises:

decrypting, by the relay QKD node apparatus, the encrypted master key with an inbound quantum key pertaining to the QKD node apparatus;

encrypting, by the relay QKD node apparatus, the decrypted master key with an outbound quantum key shared with a third QKD node apparatus, which is a next QKD apparatus on the routing path;

generating a packet including the encrypted master key, the information about the routing path, the master key ID, and a quantum key ID; and transmitting the packet to the third QKD node apparatus.

9. The quantum key distribution method of claim 8, further comprising: when receiving the packet including the encrypted master key, the master key ID, and the quantum key ID from the QKD node apparatus, decrypting, by the second QKD node apparatus, the master key included in the packet with an inbound quantum key shared with the QKD node apparatus, storing, by the second QKD node apparatus, the master key, and delivering, by the second QKD node apparatus, the master key corresponding to the master key ID to the second secure application connected with the second QKD node apparatus when the master key is requested by the second secure application using the master key ID.

10. The quantum key distribution method of claim 8, further comprising:

when the third QKD node apparatus receives the packet from the relay QKD node apparatus and confirms that the third QKD node apparatus is a final destination based on the information about the routing path included in the packet, decrypting, by the third QKD node apparatus, the encrypted master key with an inbound quantum key pertaining to the relay QKD node apparatus; and delivering, by the third QKD node apparatus, the master key corresponding to the master key ID to a secure application connected with the third QKD node when the master key is requested by the secure application using the master key ID.

11. The quantum key distribution method of claim 8, further comprising:

when a group key is requested by the secure application connected with the QKD node apparatus using IDs of multiple secure applications as parameters, generating, by the QKD node apparatus, the group key using a random number and delivering the generated group key and a group key ID to the secure application;

retrieving, by the QKD node apparatus, a path along which the group key is to be transmitted using an internal routing table and the IDs of the multiple secure applications; and delivering, by the QKD node apparatus, a packet including the group key encrypted with an outbound quantum key shared with a next QKD node apparatus on the path, the group key ID, information about the path, the IDs of the multiple secure applications, and a quantum key ID to the next QKD node apparatus on the path.

12. The quantum key distribution method of claim 11, further comprising:

when the packet includes the group key and when the IDs of the multiple secure applications include an ID of a secure application connected with the next QKD node apparatus on the path, storing, by the next QKD node apparatus on the path, the group key and the group key ID; and deleting, by the next QKD node apparatus on the path, path information pertaining thereto and the ID of the secure application connected with the next QKD node apparatus on the path from the packet.

13. The quantum key distribution method of claim 9, wherein, when the master key is present in a large number thereof, the master key is encrypted or decrypted based on a block cipher.

\* \* \* \* \*